(12) United States Patent
Goswami et al.

(10) Patent No.: US 7,835,822 B2
(45) Date of Patent: Nov. 16, 2010

(54) SYSTEMS AND METHODS FOR CONTROLLING A LEGGED ROBOT USING A TWO-PHASE DISTURBANCE RESPONSE STRATEGY

(75) Inventors: Ambarish Goswami, Fremont, CA (US); Muhammad E. Abdallah, Stanford, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1247 days.

(21) Appl. No.: 11/392,312

(22) Filed: Mar. 28, 2006

(65) Prior Publication Data

US 2006/0241809 A1 Oct. 26, 2006

Related U.S. Application Data

(60) Provisional application No. 60/666,817, filed on Mar. 30, 2005.

(51) Int. Cl.
*G05B 19/04* (2006.01)
(52) U.S. Cl. .................. 700/250; 700/245; 700/254; 700/260; 700/261; 318/568.12; 318/568.17; 318/568.18
(58) Field of Classification Search .............. 700/28, 700/245, 250, 254, 260, 258, 261, 262; 318/568.12, 318/568.17, 568.18
See application file for complete search history.

(56) References Cited

U.S. PATENT DOCUMENTS 5,214,749 A * 5/1993 Brown ................. 700/260

| 5,357,433 | A | | 10/1994 | Takenaka et al. |
| 5,513,106 | A | * | 4/1996 | Yoshino et al. ................. 701/23 |
| 6,992,456 | B2 | | 1/2006 | Furuta et al. |
| 7,000,933 | B2 | * | 2/2006 | Arling et al. ................. 280/204 |

(Continued)

FOREIGN PATENT DOCUMENTS

WO     WO 03/057425     7/2003

OTHER PUBLICATIONS

Shuuji Kajita et al. "Dynamic Walking Control of a Biped Robot Along a Potential Energy Conserving Orbit", Aug. 1992, IEEE Transactions on Robotics and Automation, vol. 8, No. 4, pp. 431-438.*

(Continued)

*Primary Examiner*—Thomas G Black
*Assistant Examiner*—Sze-Hon Kong
(74) *Attorney, Agent, or Firm*—Fenwick & West LLP; Mark E. Duell

(57) ABSTRACT

Systems and methods are presented that enable a legged robot to maintain its balance when subjected to an unexpected force. In the reflex phase, the robot withstands the immediate effect of the force by yielding to it. In one embodiment, during the reflex phase, the control system determines an instruction that will cause the robot to perform a movement that generates a negative rate of change of the robot's angular momentum at its centroid in a magnitude large enough to compensate for the destabilizing effect of the force. In the recovery phase, the robot recovers its posture after having moved during the reflex phase. In one embodiment, the robot returns to a statically stable upright posture that maximizes the robot's potential energy. In one embodiment, during the recovery phase, the control system determines an instruction that will cause the robot to perform a movement that increases its potential energy.

20 Claims, 10 Drawing Sheets

U.S. PATENT DOCUMENTS

| | | | | |
|---|---|---|---|---|
| 7,053,577 | B2* | 5/2006 | Nagasaka | 318/568.12 |
| 7,076,337 | B2* | 7/2006 | Kuroki et al. | 700/254 |
| 7,113,849 | B2* | 9/2006 | Kuroki et al. | 700/245 |
| 7,217,247 | B2* | 5/2007 | Dariush et al. | 601/5 |
| 7,370,713 | B1* | 5/2008 | Kamen | 180/7.1 |
| 7,493,192 | B2 | 2/2009 | Takenaka et al. | |
| 2002/0022907 | A1 | 2/2002 | Takenaka et al. | |
| 2004/0254679 | A1 | 12/2004 | Nagasaka | |
| 2005/0234593 | A1 | 10/2005 | Goswami et al. | |
| 2005/0240307 | A1* | 10/2005 | Kuroki et al. | 700/245 |
| 2005/0267630 | A1* | 12/2005 | Kajita et al. | 700/245 |
| 2006/0139355 | A1* | 6/2006 | Tak et al. | 345/473 |
| 2007/0016329 | A1* | 1/2007 | Herr et al. | 700/250 |

OTHER PUBLICATIONS

Kajita et al., "Resolved Momentum Control: Humanoid Motion Planning based on the Linear and Angular Momentum", Oct. 2003, Intl. Conference on Intelligent Robots and Systems, Proceedings of the 2003 IEEE/RSJ, pp. 1644-1650.*

Kuffner et al. "Motion Planning for Humanoid Robots Under Obstacle and Dynamic Balance Constraints", 2001, In Proc. 2001 IEEE Int'l Conf. on Robotics and Automation (ICRA 2001), pp. 1-7.*

Kagami et al. "Design and Implementation of Remotely Operation Interface for Humanoid Robot", May 21-26, 2001, Proceedings of the 2001 IEEE International Conference on Robotics & Automation, pp. 401-406.*

Elftman "The Rotation of the Body in Walking", Dec. 1938, From the Department of Zoology, Columbia University, New York, pp. 477-484.*

PCT International Search Report and Written Opinion, PCT/US06/12002, Jul. 11, 2007.

Abdallah, M. et al., "A Biomechanically Motivated Two-Phase Strategy for Biped Upright Balance Control," Proceedings of the 2005 IEEE International Conference on Robotics and Automation, Barcelona, Spain, Apr. 2005, pp. 2008-2013.

Arai, H., "Controllability of a 3-DOF Manipulator with a Passive Joint under a Nonholonomic Constraint,". Proceedings of the 1996 IEEE International Conference on Robotics and Automation, Apr. 1996, pp. 3707-3713.

Azevedo, C. et al., "Artificial Locomotion Control: From Human to Robots," Robotics and Autonomous Systems, 2004, pp. 203-223, vol. 47.

Beer, F. et al., "Vector Mechanics for Engineers: Statics and Dynamics," 1984, McGraw-Hill, Inc., pp. 408-409.

De Luca, A. et al., "Trajectory Planning and Control for Planar Robots with Passive Last Joint," The International Journal of Robotics Research, May-Jun. 2002, pp. 575-590, vol. 21, No. 5-6.

Feldenkrais, M., "Body and Mature Behaviour," 1966, International Universities Press Inc., pp. 66-78.

Goswami, A., "Postural Stability of Biped Robots and the Foot-Rotation Indicator (FRI) Point," The International Journal of Robotics Research, Jun. 1999, pp. 523-533, vol. 18, No. 6.

Goswami, A. et al., "Rate of Change of Angular Momentum and Balance Maintenance of Biped Robots," Proceedings of the 2004 IEEE International Conference on Robotics & Automation, Apr. 2004, pp. 3785-3790.

Harada, K. et al., "Pushing Manipulation by Humanoid Considering Two-Kinds of ZMPs," Proceedings of the 2003 IEEE International Conference on Robotics & Automation, Sep. 14-19, 2003, pp. 1627-1632.

Hemami, H., "Reduced Order Models for Biped Locomotion," IEEE Transactions on Systems, Man, and Cybernetics, vol. SMC-8, No. 4, Apr. 1978, pp. 321-325.

Hirai, K. et al., "The Development of Honda Humanoid Robot," Proceedings of the 1998 IEEE International Conference on Robotics & Automation, May 1998, pp. 1321-1326.

Horak, F.B. et al., "Central Programming of Postural Movements: Adaptation to Altered Support-Surface Configurations," Journal of Neurophysiology, Jun. 1986, pp. 1369-1381, vol. 55, No. 6.

Huang, Q. et al., "Balance Control of a Biped Robot Combining Off-Line Pattern with Real-Time Modification," Proceedings of the 2000 IEEE International Conference on Robotics & Automation, Apr. 2000, pp. 3346-3352.

Kajita, S. et al., "Resolved Momentum Control: Humanoid Motion Planning Based on the Linear and Angular Momentum," Proceedings of the 2003 IEEE/RSJ Intl. Conference on Intelligent Robots and Systems, Oct. 2003, pp. 1644-1650.

Katic D. et al., "Survey of Intelligent Control Techniques for Humanoid Robots," Journal of Intelligent and Robotic Systems, 2003, pp. 117-141, vol. 37.

Khatib, O. et al., "Human-Like Motion from Physiologically-Based Potential Energies," On Advances in Robotics Kinematics, 2004, Springer.

Kobayashi, K. et al., "Controllability of Under-Actuated Planar Manipulators with One Unactuated Joint," Proceedings of the 2000 IEEE/RSJ International Conference on Intelligent Robots and Systems, 2000, pp. 133-138.

Luh, J.Y.S. et al., "Resolved-Acceleration Control of Mechanical Manipulators," IEEE Transactions on Automatic Control, Jun. 1980, pp. 468-474, vol. AC-25, No. 3.

Mitobe, K. et al., "A New Control Method for Walking Robots Based on Angular Momentum," Mechatronics, 2004, pp. 163-174, vol. 14.

Popovic, M. et al., "Angular Momentum Regulation during Human Walking: Biomechanics and Control," Proceedings of the 2004 IEEE International Conference on Robotics & Automation, Apr. 2004, pp. 2405-2411.

Press, W.H. et al., "Numerical Recipes in C: The Art of Scientific Computing," 1995, Cambridge University Press, pp. 681-688, 804-808.

Sardain, P. et al., "Forces Acting on a Biped Robot. Center of Pressure—Zero Moment Point," IEEE Transactions on Systems, Man, and Cybernetics—Part A: Systems and Humans, Sep. 2004, pp. 630-637, vol. 34, No. 5.

Shumway-Cook, A. et al., "Motor Control: Theory and Practical Applications," 2001, Lippincott Williams & Wilkins, pp. 173-176.

Spong, M.W. et al., "Robot Dynamics and Control," 1989, John Wiley & Sons, pp. 142-143.

Sugihara, T. et al., "Whole-Body Cooperative COG Control Through ZMP Manipulation for Humanoid Robots," IEEE Conference on Intelligent Robots and Systems, 2002.

Todd, D.J., "Walking Machines: An Introduction to Legged Robots," 1985, Anchor Press Ltd, pp. 108-112.

Vidyasagar, M., "Nonlinear Systems Analysis," 1993, Prentice-Hall, Inc., pp. 219-235.

Vukobratović, M., "How to Control Artificial Anthropomorphic Systems," IEEE Transactions on Systems, Man, and Cybernetics, Sep. 1973, pp. 497-507, vol. SMC-3, No. 5.

Vukobratović, M. et al., "Biped Locomotion: Dynamics, Stability, Control and Application," 1990, pp. 309-312, Springer-Verlag.

Vukobratović, M. et al., "Zero-Moment Point—Thirty Five Years of Its Life," International Journal of Humanoid Robotics, 2004, pp. 157-173, vol. 1, No. 1.

Wieber, P.-B., "On the stability of walking systems," Proceedings: The Third IARP (International Advanced Robotics Program) International Workshop on Humanoid and Human Friendly Robotics, Tsukuba, Ibaraki, Japan, Dec. 11-12, 2002, pp. 53-59.

Winter, D.A., "Human Balance and Posture Control During Standing and Walking," Gait & Posture, Dec. 1995, pp. 193-214, vol. 3.

Yagi, M. et al., "Biped Robot Locomotion in Scenes with Unknown Obstacles," Proceedings of the 1999.IEEE International Conference on Robotics & Automation, May 1999, pp. 375-380.

Dempster, W.T., "The Anthropometry of Body Action," Annals of the New York Academy of Sciences, vol. 63, Art. 4, 1955, pp. 559-585.

Elftman, H., "The Rotation of the Body in Walking," Department of Zoology, Columbia University, Dec. 1938, pp. 33-40.

Greenwood, D. T., "Chapter 4: Dynamics of a System of Particles, Sec. 4-5: Angular Momentum," Principles of Dynamics, 1965, pp. 142-145, Prentice-Hall, Inc., New Jersey.

Gu, J. W., "The Regulation of Angular Momentum During Human Walking," Thesis, Massachusetts Institute of Technology, Jun. 2003.

Hardarson, F., "Stability Analysis and Synthesis of Statically Balanced Walking for Quadruped Robots," Ph.D. Dissertation, Royal Institute of Technology, Stockholm, 2002.

Hardt, M., et al., "The Role of Motion Dynamics in the Design, Control and Stability of Bipedal and Quadrupedal Robots," RoboCup 2002: Robot Soccer World, 2003, pp. 206-223.

Hardt, M., et al., "Increasing Stability in Dynamic Gaits Using Numerical Optimization," Proceedings of the 15$^{th}$ IFAC World Congress on Automatic Control, Jul. 21-26, 2002, pp. 1636-1641, Barcelona, Spain.

Herr, H. et al., "Chapter 5: Cyborg Technology—Biomimetic Orthotic and Prosthetic Technology," Biologically-Inspired Intelligent Robots, Y. Bar-Cohen and C. Breazeal, Bellingham, Washington, SPIE Press, 2003, pp. 103-143.

Hofmann, A., et al., "A Sliding Controller for Bipedal Balancing Using Integrated Movement of Contact and Non-Contact Limbs," Proceedings of the *IEEE/RSJ International Conference on Intelligent Robots and Systems*, Japan, 2004, pp. 1952-1959.

Huang, Q. et al., "Planning Walking Patterns for a Biped Robot," *IEEE Transactions on Robotics and Automation*, vol. 17, No. 3, 2001, pp. 280-289.

Ito, S. et al., "A Consideration on Position of Center of Ground Reaction Force in Upright Posture," *Proceedings of the Society of Instrument and Control Engineers (SICE) Annual Conference*, Osaka, Japan, Aug. 2002, pp. 1225-1230.

Kagami, S. et al., "AutoBalancer: An Online Dynamic Balance Compensation Scheme for Humanoid Robots," *Proceedings of the 4$^{th}$ International Workshop on the Algorithmic Foundations of Robotics*, 2000, pp. 329-339.

Kurazume, R. et al., "The Sway Compensation Trajectory for a Biped Robot," *Proceedings of the IEEE International Conference on Robotics & Automation (ICRA)*, 2003, Taiwan, pp. 925-931.

Li, Q. et al., "Learning Control of Compensative Trunk Motion for Biped Walking Robot Based on ZMP Stability Criterion," *Proceedings of the IEEE/RSJ International Conference on Intelligent Robots and Systems*, vol. 1, Raleigh, N.C., Jul. 1992, pp. 597-603.

Lin, B-S. et al., "Dynamic Modeling, Stability and Energy Efficiency of a Quadrupedal Walking Machine," *Proceedings of the IEEE International Conference on Robotics & Automation (ICRA)*, 1993, Atlanta, GA, pp. 367-373.

Lynch, K. M. et al., "Dynamic Nonprehensile Manipulation: Controllability, Planning, and Experiments," *The International Journal of Robotics Research*, vol. 18, No. 1, Jan. 1999, pp. 64-92.

Orin, D., "Interactive Control of a Six-Legged Vehicle with Optimization of Both Stability and Energy," Ph.D. Dissertation, The Ohio State University, 1976.

Perry, J., "Chapter 3: Basic Functions," *Gait Analysis: Normal and Pathological Function*, SLACK Inc., Thorofare, N.J., 1992, pp. 19-47.

Popovic, M. et al., "Angular Momentum Primitives for Human Walking: Biomechanics and Control," Proceedings of the *IEEE/RSJ International Conference on Intelligent Robots and Systems*, Japan, 2004, pp. 1685-1691.

Popovic, M. et al., "Conservation of Angular Momentum During Human Locomotion," Artificial Intelligence Laboratory Research Abstracts, Sep. 2002, pp. 264-265.

Popovic, M. et al., "Global Motion Control and Support Base Planning," *Proceedings of the International Conference on Intelligent Robots and Systems*.

Popovic, M. et al., "Ground Reference Points in Legged Locomotion: Definitions, Biological Trajectories and Control Implications," *International Journal of Robotics Research*, (Submitted).

Popovic, M. et al., "Zero Spin Angular Momentum Control: Definition and Applicability," Proceedings of the *IEEE-RAS/RSJ International Conference on Humanoid Robots*, Santa Monica, CA.

Sano, A. et al., "Control of Torque Distribution for the BLR-G2 Biped Robot," *Proceedings of the Int. Conf. on Advanced Robotics (ICAR)*, 1991, pp. 729-734.

Sano, A. et al., "Realization of Natural Dynamic Walking Using the Angular Momentum Information," IEEE International Conference on Robotics and Automation, May 1990, pp. 1476-1481.

Shih, C-L, "The Dynamics and Control of a Biped Walking Robot with Seven Degrees of Freedom," *Transactions of the ASME: Journal of Dynamic Systems, Measurement, and Control*, vol. 118, Dec. 1996, pp. 683-690.

Sian, N. E. et al., "Whole Body Teleoperation of a Humanoid Robot—A Method of Integrating Operator's Intention and Robot's Autonomy," *Proceedings of the IEEE International Conference on Robotics & Automation (ICRA)*, Taiwan, 2003, pp. 1613-1619.

Silva, F.M. et al., "Goal-Oriented Biped Walking Based on Force Interaction Control," *Proceedings of the IEEE International Conference on Robotics & Automation (ICRA)*, Korea, 2001, pp. 4122-4127.

Sugihara, T. et al., "Realtime Humanoid Motion Generation Through ZMP Manipulation Based on Inverted Pendulum Control," *Proceedings of the IEEE International Conference on Robotics & Automation (ICRA)*, Washington, D.C., 2002, pp. 1404-1409.

Takanishi, A. et al., "Realization of Dynamic Biped Walking Stabilized by Trunk Motion on a Sagittally Uneven Surface," *Proceedings of the IEEE International Workshop on Intelligent Robots and Systems*, 1990, pp. 323-330.

Vukobratović, M. et al., "On the Stability of Biped Locomotion," *IEEE Transactions on Bio-medical Engineering*, vol. BME-17, No. 1, Jan. 1970, pp. 25-36.

Wong, T., et al., "Stabilization of Biped Dynamic Walking Using Gyroscopic Couple," IEEE International Joint Symposia, Nov. 4-5, 1996, pp. 102-108.

Yamada, M. et al., "Dynamic Control of Walking Robot with Kick-Action," *Proceedings of the Int. Conf. on Advanced Robotics*, 1985, pp. 405-412.

Zatsiorsky, V. et al., "The Mass and Inertia Characteristics of the Main Segments of the Human Body," *International Series on Biomechanics, vol. 4B: Biomechanics VIII-B: Proceedings of the Eighth International Congress of Biomechanics*, Japan, 1983, pp. 1152-1159.

Zatsiorsky, V., *Kinetics of Human Motion*, 2002, pp. 12-19 and 583-613, Champaign, IL.

"Ground Reaction Force," [retrieved from the internet] retrieved on Mar. 28, 2005, <URL: http://kwon3d.com/theory/grf/grf.html>.

Biomechatronics Group, "Angular Momentum in Human Walking," [retrieved from the internet] retrieved on Jun. 23, 2005, <URL: http://biomech.media.mit.edu/research/pro1_3.htm>.

AMTI, "Calculations," [retrieved from the internet] retrieved on Mar. 28, 2005, <URL: http://www.amtiweb.com/calculations.htm>.

"Center of Pressure," [retrieved from the internet] retrieved on Mar. 28, 2005, <URL: http://kwon3d.com/theory/grf/cop.html>.

PCT International Search Report and Written Opinion, PCT/US05/10887, Nov. 6, 2006, 10 pages.

* cited by examiner

SYSTEMS AND METHODS FOR CONTROLLING A LEGGED ROBOT USING A TWO-PHASE DISTURBANCE RESPONSE STRATEGY

CROSS-REFERENCE TO RELATED APPLICATION

This application claims priority from the following U.S. provisional patent application, which is hereby incorporated by reference: Ser. No. 60/666,817, filed on Mar. 30, 2005, entitled "Biomechanically Motivated Two-Phase Strategy for Biped Upright Balance Control."

BACKGROUND OF THE INVENTION

1. Field of the Invention

The present invention relates to controlling a legged robot so that the robot does not fall. More particularly, the present invention relates to controlling the robot using a two-phase strategy for responding to a force disturbance.

2. Description of Background Art

Future humanoid robots are expected to freely reside within everyday human environments and to physically interact with their surroundings. A key factor for robots' successful co-existence with humans will lie in their ability to physically interact with people. This means that a robot should be able to withstand unexpected force disturbances.

In particular, a robot should be able to maintain its balance even when it has been subjected to an unexpected force. The term "balance" generally refers to the preservation of overall rotational stability or equilibrium. If a robot's overall rotational equilibrium is lost, the robot can fall. A falling robot can injure nearby people and/or badly damage the robot itself.

What is needed is a control strategy that enables a robot to maintain its balance when subjected to an unexpected force.

SUMMARY OF THE INVENTION

Systems and methods are presented that control a legged robot so that the robot does not fall. A control system implements a disturbance response strategy that enables a robot to maintain its balance when subjected to an unexpected force. In one embodiment, the disturbance response strategy includes two phases: reflex and recovery.

In the reflex or "disturbance absorption" phase, the robot withstands the immediate effect of the disturbance force by absorbing it/yielding to it. In one embodiment, during the reflex phase, the control law is based on $\dot{H}_G$, the rate of change of the robot's angular momentum at G, its center of mass (CoM). For example, the control law causes the robot to perform a movement that generates a negative $\dot{H}_G$ in a magnitude large enough to compensate for the destabilizing effect of the disturbance.

In one embodiment, the desired $\dot{H}_G$ is determined. Then, the joint accelerations that will generate the desired $\dot{H}_G$ are determined. Then, the joint torques that will generate the joint accelerations are determined. Finally, robot instructions to achieve these torques are determined. Several different types of instructions can be sent to the robot. Generally, these instructions cause the robot to change its body position by activating one or more motors. These motors control, for example, the angles of joints between two adjoining segments.

In one embodiment, during the reflex phase, the control law is also based on $\dot{L}_x$, the rate of change of the robot's linear momentum at its CoM. For example, the control law attempts to maintain the horizontal position of the robot's centroid during the above movement. In this embodiment, both the desired $\dot{H}_G$ and the desired $\dot{L}_x$ are determined. Then, the joint accelerations that will generate the desired $\dot{H}_G$ and the desired $\dot{L}_x$ are determined. Then, the joint torques that will generate the joint accelerations are determined. Finally, robot instructions to achieve these torques are determined.

In the recovery phase, the robot recovers its posture after having moved during the reflex phase. In one embodiment, the robot returns to a statically stable upright "home posture." This home posture can either minimize the robot's static joint torques, maximize the robot's potential energy, or both. In one embodiment, during the recovery phase, the control law causes the robot to perform a movement that increases its potential energy.

In one embodiment, a potential energy surface for the robot is determined. The potential energy surface comprises potential energy values, each of which is a function of the robot's configuration (for example, its joint angles). The surface is navigated in an attempt to reach its global maximum. The process of climbing the surface corresponds to the process of posture recovery, since each point on the surface represents a posture (set of joint angles) of the robot.

In one embodiment, an optimization algorithm is chosen that will maximize the robot's potential energy. The algorithm determines a new configuration ("guess") using the robot's current configuration (posture) as the "initial guess" for optimization. Then, a set of robot instructions is determined that causes the robot's joint angles to match the determined configuration (posture).

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION OF THE EMBODIMENTS

Figure 1:
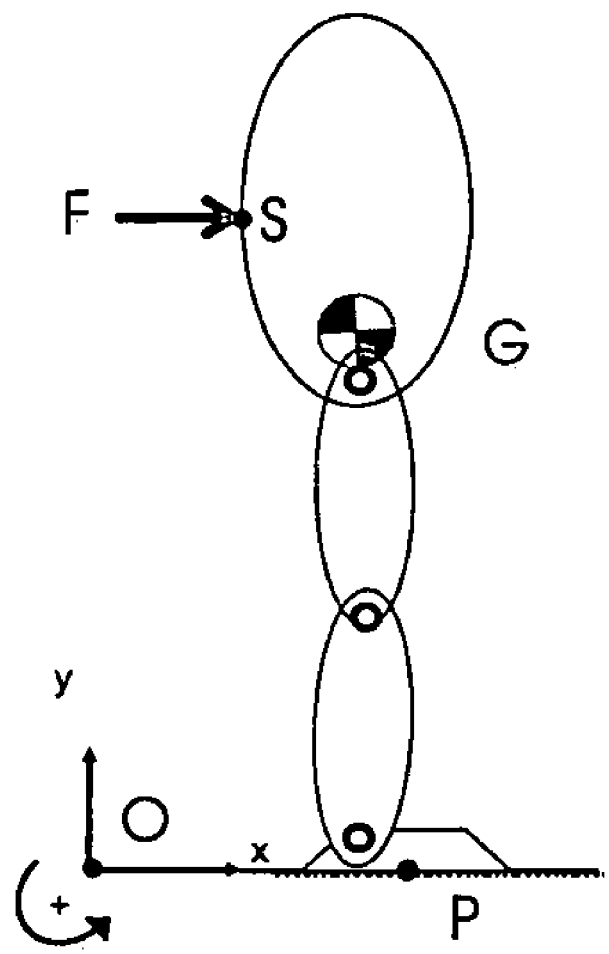
FIG. 1 illustrates a diagram of a robot being subjected to a disturbance force, according to one embodiment of the invention.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to an apparatus for performing the operations herein. This apparatus is specially constructed for the required purposes, or it comprises a general-purpose computer selectively activated or reconfigured by a computer program stored in the computer. Such a computer program is stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems are used with programs in accordance with the teachings herein, or more specialized apparatus are constructed to perform the required method steps. The required structure for a variety of these systems will appear from the description below. In addition, the present invention is not described with reference to any particular programming language. It will be appreciated that a variety of programming languages may be used to implement the teachings of the invention as described herein.

1. Overview of Two-Phase Disturbance Response Strategy

A robot control system implements a disturbance response strategy that enables a robot to maintain its balance when subjected to an unexpected force. In one embodiment, the disturbance response strategy is used to maintain a legged robot's balance while the robot is an upright stance (as opposed to while the robot is walking or bent over). In another embodiment, the disturbance response strategy is used when the robot has been subjected to a disturbance force acting on the robot at a location above the robot's center of mass.

In one embodiment, the disturbance response strategy includes two phases: reflex and recovery. In the reflex or "disturbance absorption" phase, the robot withstands the immediate effect of the disturbance force by absorbing it/yielding to it. In the recovery phase, the robot recovers its posture. In one embodiment, the time period of the reflex phase corresponds to the time period in which the robot is being subjected to the disturbance force. After the reflex phase ends, the recovery phase begins.

Before the reflex phase and recovery phase are explained in depth, it is useful to consider a robot's situation when it is acted upon by a disturbance force. FIG. 1 illustrates a diagram of a robot being subjected to a disturbance force, according to one embodiment of the invention. The robot is a single-leg plus head-arms-trunk (HAT) model in the sagittal plane. The model contains four segments: foot, shank, thigh, and HAT. These rigid body segments are interconnected through three actuated joints: ankle, knee, and hip. Note that the robot model shown in FIG. 1 can represent a wide variety of legged robots. For example, the HAT segment can include multiple segments, such as a torso, head, upper arms, lower arms, and hands. The HAT segment can also include multiple joints, such as a neck, shoulders, elbows, and wrists. Also, the robot model can have more than one leg.

In FIG. 1, the robot is standing on a horizontal groundplane in an upright posture. FIG. 1 also includes the coordinate conventions for the x-axis, the y-axis, and rotation.

In FIG. 1, O represents an origin point on the groundplane. P represents the center of pressure (CoP). The CoP is the point of application of the resultant ground reaction force (GRF) underneath the robot's foot. G represents the robot's centroid (center of mass or "CoM"). F represents the disturbance force. S represents the location at which F is being applied. In FIG. 1, F is being applied in a purely horizontal direction.

With respect to O, the equation for the location of P for a general spatial system is:

$$OP = \frac{n \times (\dot{H}_O - OG \times mg - OS \times F)}{n \cdot R} \quad (1)$$

where OP represents the vector from O to P; n represents the ground normal vector; x represents the vector product operation; vector $\dot{H}_O$ represents the time-derivative of the angular momentum about point O; OG represents the vector from O to G; m represents the total mass of the robot; g represents the gravity acceleration vector; OS represents the vector from O to S; F represents the net "non-ground" external force assumed to be applied at S; represents the dot product operation; and R represents the GRF.

If the robot's motion is planar, the ground is horizontal (i.e., n×g=0), and the disturbance force is horizontal (i.e., F=Fi), then Equation 1 simplifies to:

$$OP_x = \frac{1}{d}(mgOG_x + \dot{H}_O + OS_y F) \quad (2)$$

where $OP_x$ represents the x-coordinate of point P; d represents $\dot{L}_y$+mg (where $\dot{L}_y$ is the y-component of the time-derivative of linear momentum, L); $OG_x$ represents the x-coordinate of point G; and $OS_y$ represents the y-coordinate of point S.

Note that d is a positive quantity. When a robot begins in a standing position, it is at or close to a singularity for motion in the y-direction. Thus, the change in the y-direction is relatively small. It is difficult for the CoM to fall faster than gravity, which is required to make d negative.

For static conditions, the CoP is initially directly underneath the CoM (i.e., $OP_x$=$OG_x$). A positive F will push the CoP in the forward direction. The larger the force, the closer the CoP will get to the front edge of the foot. This can be countered by a negative $\dot{H}_O$, which occurs when the robot "falls forward" in the clockwise direction.

The faster the robot can increase the magnitude of $\dot{H}_O$, the larger the force it can withstand or absorb. Alternatively, if the robot resists the force (e.g., by holding rigid or accelerating backwards), it will exacerbate the situation by pushing the CoP further forward. However, the robot cannot rotate indefinitely in an accelerated fashion. The rotation moves the CoM forward, making it more and more difficult to keep the CoP within the foot area.

Thus, in one embodiment, disturbance absorption is implemented in such a manner as to try to keep the CoM in a constant horizontal position $OG_x$. Rearranging Equation 2 and expressing the angular momentum about the CoM (G), rather than about O, yields:

$$OP_x = OG_x + \frac{\dot{H}_G - OG_y L_x}{d} + \frac{OS_y F}{d} \quad (3)$$

The middle term on the right side of Equation 3 represents the "falling forward" term that is used to absorb the disturbance. This term includes $L_x$, which is the component that moves the CoM horizontally. Both the angular momentum $H_G$ and the linear momentum $L_x$ can be controlled independently. $H_G$ is controlled to absorb the disturbance, and $L_x$ is controlled to regulate $OG_x$.

Note that the disturbance force constitutes an angular impulse about the ground. In order to maintain balance, this impulse must be matched by one of two things: an equal and opposing angular impulse from the GRF (by the CoP moving forward) or a change in the angular momentum of the system. Since the CoP should remain stationary, there should be a corresponding change in angular momentum to compensate.

In summary, to absorb a disturbance impulse, a legged robot should provide a net change in the angular momentum of its system (excluding the foot, which is assumed to be stationary). Also, the change in angular momentum should be induced while limiting the change in linear momentum.

For more information about controlling a robot based on rate of change of angular momentum, see U.S. patent application Ser. No. 11/096,835 (Publication No. 20050234593), filed on Mar. 31, 2005, entitled "Systems and Methods for Controlling a Legged Robot Based on Rate of Change of Angular Momentum," which is hereby incorporated by reference.

The linear momentum L and angular momentum $H_G$ of a robot are vector functions of the configuration variables θ and their derivatives $\dot{θ}$. θ is an n×1 vector of generalized coordinates, where n is the number of degrees-of-freedom (DOF) of the robot. In one embodiment, n is the number of joints in a robot, and a generalized coordinate is a joint angle. In this embodiment, θ is an n×1 vector of joint angles and corresponds to a posture of the robot. L and $H_G$ are linear with respect to the derivatives of the configuration variables ($\dot{θ}$). In matrix form, they are expressed as:

$$L = D(θ)\dot{θ} \quad (4)$$

$$H_G = A(θ)\dot{θ} \quad (5)$$

In general, D and A are 3×n matrices and are referred to as the linear momentum matrix and the angular momentum matrix, respectively. Note that A depends on the point at which the angular momentum is computed. In the planar case, A is reduced to a 1×n vector, and D is reduced to a 2×n matrix. For information on how to determine A and D, see S. Kajita et al., "Resolved Momentum Control: Humanoid Motion Planning Based on the Linear and Angular Momentum," Proceedings of the IEEE/RSJ International Conference on Intelligent Robots and Systems, 2003, Las Vegas, Nev., pp. 1644-1650.

Equations 4 and 5 can be combined and written in a more compact form as:

$$p = T\dot{θ} \quad (6)$$

where $$p = \begin{bmatrix} L \\ H_G \end{bmatrix}$$

(the "momenta vector") and $$T = \begin{bmatrix} D \\ A \end{bmatrix}$$

(the "momentum matrix").

Taking the time derivative in Equation 6 yields:

$$\dot{p} = T\ddot{θ} + \dot{T}\dot{θ} \quad (7)$$

Equation 7 relates the resultant force and centroidal moment on the robot with the robot's joint velocity and acceleration. The 6×n matrix T is similar but not identical to M, the joint-space inertia matrix in the following equation, which is the standard form of dynamic motion:

$$M(θ)\ddot{θ} + N(θ,\dot{θ}) + G(θ) = τ \quad (8)$$

In Equation 8, M represents the n×n inertia matrix; N represents the n×1 vector of Coriolis and centrifugal terms; G represents the n×1 vector of joint torques induced by gravity; and τ represents the n×1 vector of generalized torques (one torque for each joint). The determinations of M, N, and G are known to one of ordinary skill in the art and are described in "Robot Control and Dynamics" by M. W. Spong et al., John Wiley and Sons, 1989, p. 142. Specifically, Equation 6.3.12 describes D (which represents M), C (which represents N), and g (which represents G).

Extracting $\ddot{\theta}$ from Equation 8 yields:

$$\ddot{\theta}=M(\theta)^{-1}(\tau-N(\theta,\dot{\theta})-G(\theta)) \qquad (9)$$

where $^{-1}$ is the inverse matrix function. Substituting this expression for $\ddot{\theta}$ in Equation 7 and omitting the functional dependence of the matrices for brevity yields:

$$\dot{p}=TM^{-1}(\tau-N-G)+\dot{T}\dot{\theta} \qquad (10)$$

which is of the form $$\dot{p}=W\tau+X \qquad (11)$$

where $W=TM^{-1}$ and $X=\dot{T}\dot{\theta}-W(N+G)$.

Equation 11 is an affine relationship between joint torques and momenta rate-change. Ignoring the "displacement" term X, W plays the role of a sensitivity matrix and is called the momentum sensitivity matrix. The rows of W are vectors that represent the direction of optimal sensitivity of momentum to the joint torques. This gives the direction in the torque space with optimal effect on the respective momentum components.

Note that a relationship exists between the inertia matrix M and the momentum matrix A when angular momentum is computed about the ankle ($H_a$). For the planar flatfoot case, the A matrix equals the top row of the M matrix. This produces a momentum sensitivity matrix of $W=[1, 0, \ldots, 0]$. This value indicates that only the ankle joint torque instantaneously affects the angular momentum about the ankle point. This is expected, since the ankle torque is the only external torque in this case; the other torques are internal.

Solving for the accelerations in Equation 6 using the Moore-Penrose pseudo-inverse yields:

$$\ddot{\theta}=T^+(\dot{p}*-\dot{T}\dot{\theta}) \qquad (12)$$

where $^+$ represents the inverse matrix operation and * represents a desired value (i.e., what the value should be to obtain the desired accelerations).

2. Reflex Phase—Controller

In one embodiment, during the reflex phase, the disturbance response strategy uses a control law based on the rate of change of the robot's angular momentum at its centroid. Specifically, the control law generates a negative rate of change of the robot's angular momentum in a magnitude large enough to compensate for the destabilizing effect of the disturbance. This change in angular momentum is accomplished by instructing the robot to perform a movement that does not include stepping or walking. In one embodiment, the disturbance response strategy also takes into account the rate of change of the robot's linear momentum at its centroid. Specifically, the control law attempts to maintain the horizontal position of the robot's CoM during the above movement.

Figure 2:
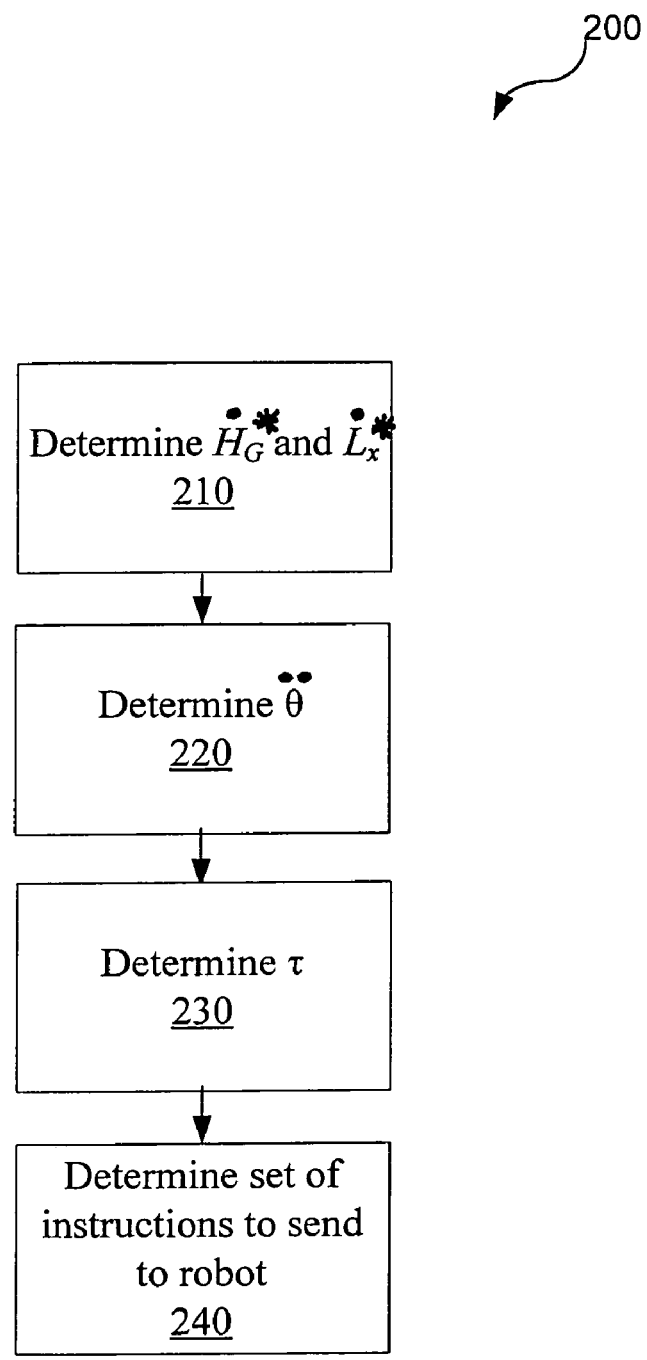
FIG. 2 illustrates a flowchart of a method for controlling a legged robot to absorb a disturbance force, according to one embodiment of the invention.

FIG. 2 illustrates a flowchart of a method for controlling a legged robot to absorb a disturbance force, according to one embodiment of the invention. In the first step of method 200, the desired rates of change of the robot's angular momentum and linear momentum at the robot's centroid are determined 210. In one embodiment, the desired rate of change of the robot's angular momentum is set to be proportional to the deviation of the CoP from the CoM and the desired rate of change of the robot's linear momentum is set to be proportional to $L_x$ (but with the opposite sign). This yields:

$$\dot{H}_G*=k_1(x_P-x_G) \qquad (13)$$

$$\dot{L}_x*=-k_2L_x \qquad (14)$$

where $k_i$ represents a positive gain; $x_P$ represents the x-coordinate of the CoP; and $x_G$ represents the x-coordinate of the CoM. $x_P$ and $x_G$ are determined through measurement, observation, or calculation, as known by one of skill in the art.

Specifically, $k_i$ represents how fast the robot reacts to the disturbance force. The larger $k_i$ is, the faster the robot reacts. Each $k_i$ is determined by trial and error. A $k_i$ is chosen, the robot is subjected to a disturbance force, and the result is observed. If $k_i$ is too large, the robot will fall because its reaction to the force was too fast, which made it lose its balance. If $k_i$ is too small, the robot will fall because its reaction to the force was too slow to adequately compensate for the force. In general, an experimentally-determined value of $k_i$ can be used for any force that is applied to a similar point on the robot and in a similar direction, regardless of magnitude (within reason). If the application point or direction of the force is different, then a new $k_i$ should be determined.

In the second step of method 200, the desired joint accelerations are determined 220. Recall that $$p = \begin{bmatrix} L \\ H_G \end{bmatrix}.$$

In one embodiment, the desired rates of change of the robot's angular momentum and linear momentum are substituted into this expression. This yields:

$$\dot{p}^* = \begin{bmatrix} \dot{L}^* \\ \dot{H}_G^* \end{bmatrix}$$

This value is then substituted into Equation 12 to determine the desired joint accelerations. Note that a controller based on Equation 12 is in an open-loop setup, attempting to control the joint accelerations on a second-order system. Thus, the controller may not be stable.

In the third step of method 200, the desired joint torques are determined 230. In one embodiment, this is accomplished by substituting the desired joint accelerations into Equation 8.

In the fourth step of method 200, a set of one or more robot instructions is determined 240. Several different types of instructions can be sent to the robot. Generally, an instruction causes the robot to change its body position by activating one or more motors. These motors control, for example, the angles of joints between two adjoining segments. An instruction can specify, for example, a desired joint torque or a desired joint angle position and the velocity and acceleration that should be used to achieve it.

In one embodiment, the determined set of instructions causes the robot to generate the desired joint torques determined in step 230. When the robot executes the set of instructions, it will perform a movement that will result in the particular joint torques desired. This, in turn, will result in the desired rates of change of angular momentum and linear momentum.

In one embodiment, method 200 is performed repeatedly. For example, after method 200 has been performed once, the set of instructions is sent to the robot. Performing these instructions will cause the robot to move. As a result, the locations of the robot's CoP and CoM can change. Method 200 will then be performed again. This time, the values of $x_P$ and $x_G$ (used in step 210) may have changed. As a result, the desired joint accelerations and joint torques determined in steps 220 and 230 may change. A set of robot instructions is then determined based on the desired joint torques. In one embodiment, method 200 is performed at a rate of 200 Hz (i.e., 200 times per second) until the disturbance force has subsided.

3. Home Posture

In the recovery phase, the robot recovers its posture after having moved during the reflex phase. In one embodiment, the robot returns to a statically stable upright posture. This posture can be, for example, a "home" posture or the posture the robot had before it was subjected to the disturbance force. Posture recovery is accomplished by instructing the robot to perform a movement.

In one embodiment, a robot's home posture is defined to be the configuration that minimizes the robot's static joint torques. Static torque components are induced by gravity. They equal zero when the gravity forces are passively supported by the structure of the robot (as opposed to actively compensated by the joint motors). When a robot's posture minimizes the static joint torques, it greatly reduces the energy expended by the robot.

Figure 3A:
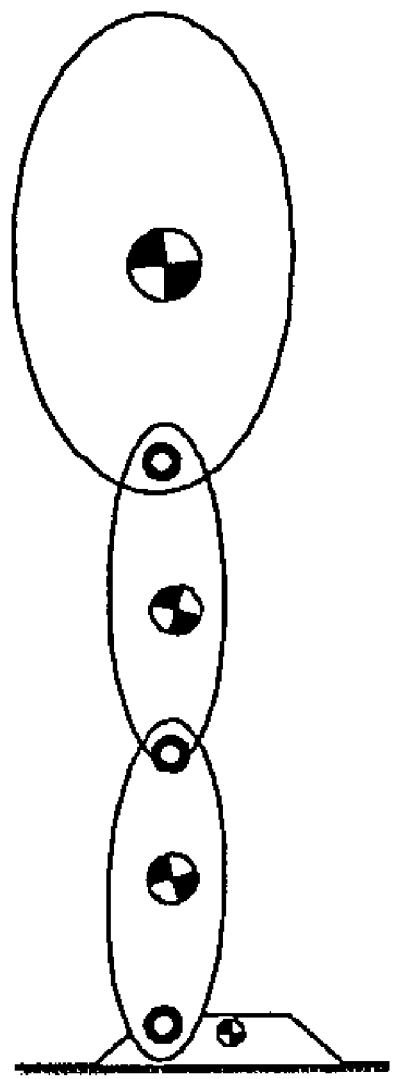
FIG. 3A illustrates a diagram of a robot that possesses maximum potential energy, according to one embodiment of the invention.
Figure 3B:
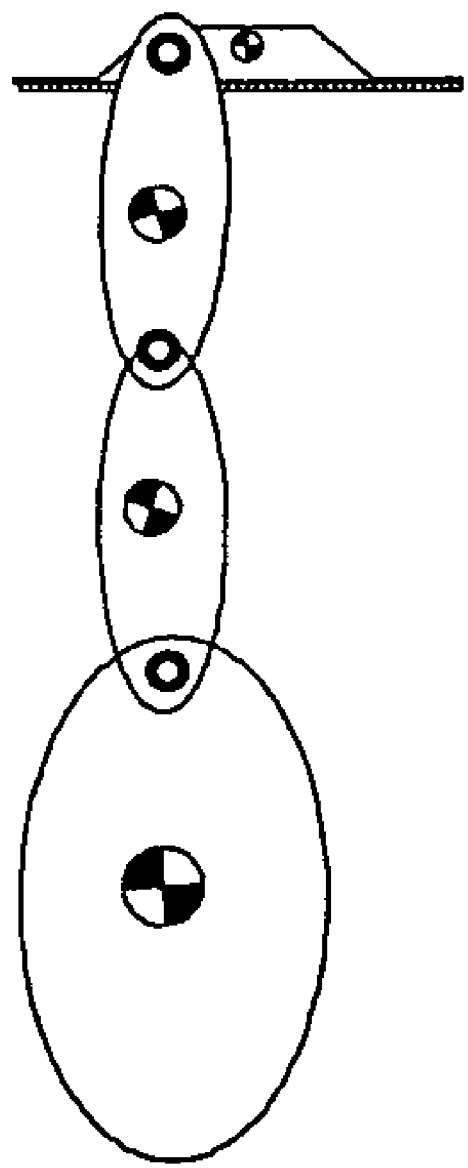
FIG. 3B illustrates a diagram of a robot that possesses minimum potential energy, according to one embodiment of the invention.
Figure 3C:
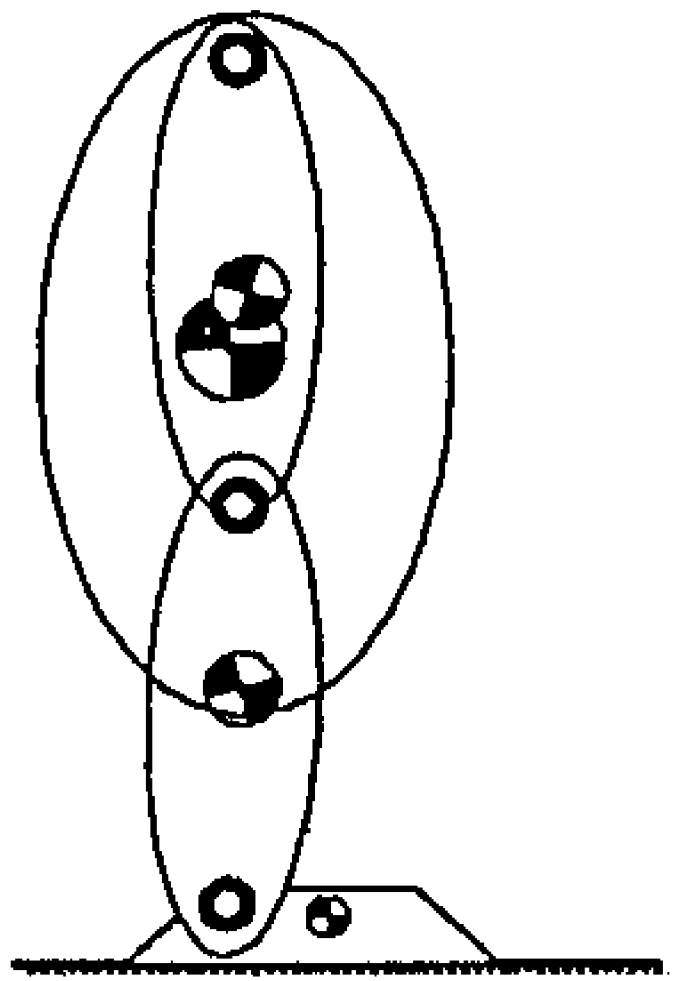
FIG. 3C illustrates a diagram of a robot that possesses a potential energy value corresponding to a saddle point of the potential energy surface, according to one embodiment of the invention.

FIGS. 3A, 3B, and 3C show examples of robot configurations where the static joint torques all equal zero, according to one embodiment of the invention. In FIG. 3A, the robot is standing completely upright. In FIG. 3B, the robot's foot is on the ground, but the rest of the robot (the shank, thigh, and HAT) are hanging upside down below the ground. In FIG. 3C, the robot is partially upright. Specifically, the foot, shank, and thigh are upright, but the HAT is hanging upside down. These configurations will be further discussed below. Note that some of these configurations might be inconsistent with other physical considerations, such as joint limits and ground contact.

The G vector in Equation 8 (the standard form of dynamic motion) represents the gravitational torques. Recall that G is an n×1 vector of joint torques induced by gravity. G is also the gradient of the gravitational potential energy function V:

$$G = \frac{\partial V}{\partial \theta^T} \quad (15)$$

For a robot with no prismatic joints, the potential energy function V is a continuous sinusoidal function. This means that V has a global maximum, a global minimum, and several saddle points. Note that V has no local minima or local maxima. At a saddle point, V increases with respect to one or more joints and decreases with respect to another joint or joints. FIG. 3A illustrates a diagram of a robot that possesses maximum potential energy, according to one embodiment of the invention. FIG. 3B illustrates a diagram of a robot that possesses minimum potential energy, according to one embodiment of the invention. FIG. 3C illustrates a diagram of a robot that possesses a potential energy value corresponding to a saddle point of the potential energy surface, according to one embodiment of the invention.

When a legged robot holds its CoM at the highest possible location, a maximum amount of potential energy is stored. This potential energy can be used to move the robot in any direction, thereby decreasing the amount of energy expenditure necessary. In other words, the posture with maximum potential energy minimizes the static joint torques while maximizing the mobility in the horizontal plane. Thus, in one embodiment, a robot's home posture is defined to be the configuration that not only minimizes the robot's static joint torques but also maximizes the robot's potential energy.

Note that the configuration that maximizes a robot's potential energy might be undesirable for various reasons. For example, if a robot has arms, the configuration that maximizes its potential energy would position the arms pointing upwards, rather than hanging down at the robot's sides. This configuration looks awkward and thus might be undesirable. Thus, in one embodiment, a robot's home posture does not completely maximize its potential energy.

4. Recovery Phase—Controller

In one embodiment, during the recovery phase, the disturbance response strategy uses a control law based on the robot's potential energy. Specifically, the control law maximizes the robot's potential energy. This change in potential energy is accomplished by instructing the robot to perform a movement. Performing the movement increases the robot's potential energy.

In one embodiment, the disturbance response strategy determines a potential energy surface for the robot. The potential energy surface comprises potential energy values, each of which is a function of the robot's configuration (e.g., joint angles). The boundaries of the surface correspond to joint limits.

Figure 4:
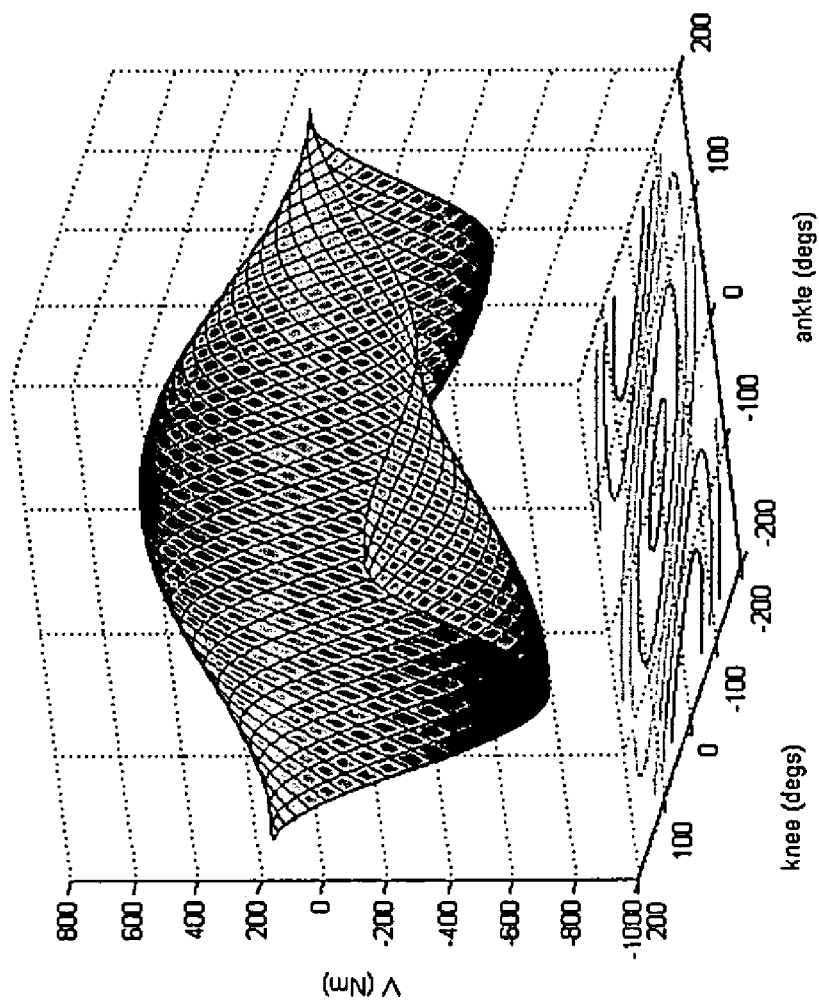
FIG. 4 illustrates a graph of a robot's potential energy surface, according to one embodiment of the invention.

In one embodiment, a potential energy surface is n-dimensional in an n+1-dimensional space, with one dimension for each joint angle (n joints total) and one dimension for potential energy. FIG. 4 illustrates a graph of a robot's potential energy surface, according to one embodiment of the invention. In this embodiment, in order to aid explanation, the robot's hip joint is locked in place. As a result, the illustrated potential energy surface is only two-dimensional. The x-axis and the y-axis correspond to the angles of the ankle joint and the knee joint (expressed in degrees). The z-axis corresponds to the potential energy function V (expressed in Newton meters).

The control law navigates the potential energy surface and attempts to reach its global maximum. In other words, the control law attempts to maximize the potential energy by guiding the robot to the peak of the V function. The process of climbing the surface corresponds to the process of posture recovery, since each point on the surface represents a posture (set of joint angles) of the robot. The navigation problem is similar to the function optimization problem in the field of numerical algorithms. The current configuration of the robot (e.g., after the reflex phase has ended) is used as the "initial guess" for optimization (here, maximization). For more information about the function optimization problem, see W.H. Press et al., "Numerical Recipes in C: The Art of Scientific Computing," Cambridge, Cambridge University Press, 1992.

Many different optimization algorithms exist and can be used to navigate the potential energy surface. If any of the robot's joints have constraints, these constraints can be taken into account by using constrained optimization algorithms. In one embodiment, the control law uses a first-order gradient-based strategy. Specifically, the control law uses the property that the gradient points in the direction of steepest ascent. The following equation was determined based on Equation 15:

$$\dot{q} = kG \quad (16)$$

where k is a constant positive gain. This strategy is referred to as the Gradient method.

Recall that the potential energy function for a system with no prismatic joints is a continuous, smooth sinusoid without local extrema. The Gradient method will thus successfully navigate to the home (maximum potential energy) posture. An exception exists if the robot begins in a configuration that is located either at a saddle point or on the one axis from the saddle point that points to the home posture.

The efficiency of the Gradient method and its slowness near the maxima can be improved with Newton-type methods requiring second-order derivatives. However, second-order approaches do have some problems. For example, they are not guaranteed to converge if the start point is not sufficiently close to the extrema that is being sought.

In one embodiment, the control law uses a mixed technique of Levenberg-Marquardt type formulation. This method has the strengths of both first-order and second-order methods while avoiding their pitfalls. A control strategy under this formulation can be expressed as:

$$\dot{\theta} = k[Q + \lambda I]^{-1} G \quad (17)$$

where $$Q = \frac{\partial^2 V}{\partial \theta^2}$$

is the n×n Hessian matrix of second-order partials. For more information about Levenberg-Marquardt type formulation, see W.H. Press et al., "Numerical Recipes in C: The Art of Scientific Computing," Cambridge, Cambridge University Press, 1992.

A better progression direction is obtained if matrix I in Equation 17 is replaced by the diagonal matrix $B^2$ where the elements of B are defined as $$B_{ii} = \sqrt{(Q_{ii})} \text{ for } Q_{ii} \neq 0 \quad (18)$$

$$B_{ii} = 1 \text{ for } Q_{ii} = 0 \quad (19)$$

At joint angles far from the global maxima, λ is large, and the method resembles a first-order method. As the search moves closer to the global maximum, λ is continuously reduced, and the method resembles more and more a Newton method.

Note that the above strategies are not iterative. They are not being used for nonlinear optimization. Rather, they are being used to set the instantaneous direction in joint-space at each time-step that will guide the robot to the global (maximum potential energy) solution.

Figure 5:
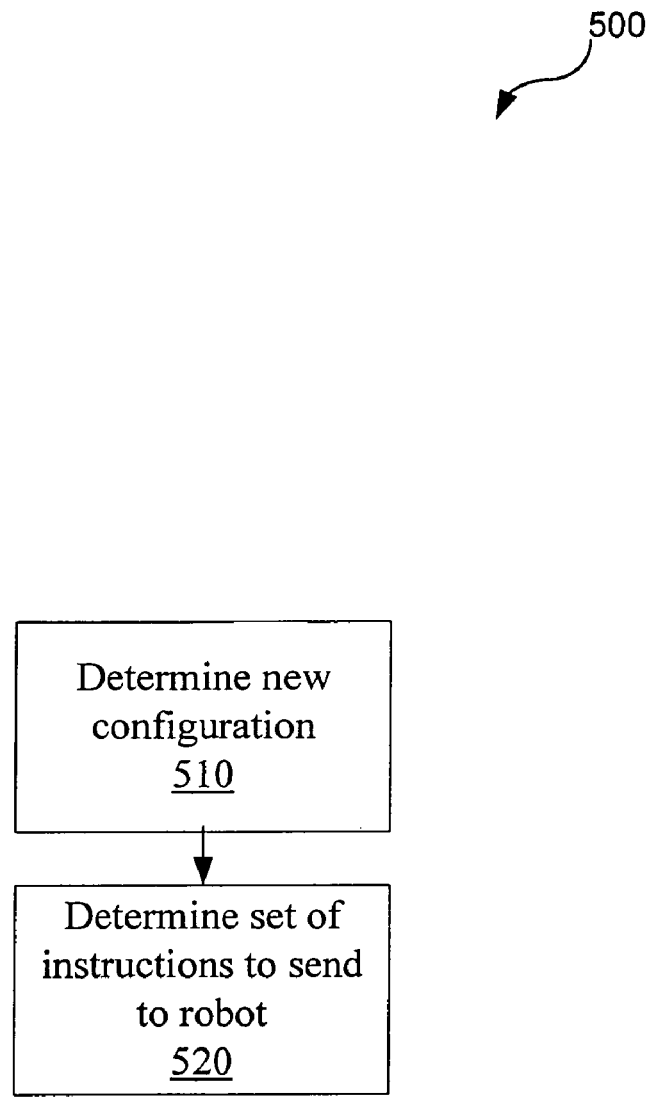
FIG. 5 illustrates a flowchart of a method for controlling a legged robot to recover a posture, according to one embodiment of the invention.

FIG. 5 illustrates a flowchart of a method for controlling a legged robot to recover a posture, according to one embodiment of the invention. Before method 500 begins, an optimization algorithm is chosen that will maximize the robot's potential energy. In the first step of method 500, the optimization algorithm determines 510 a new configuration ("guess") using the robot's current configuration (posture) as the "initial guess" for optimization.

In the second step of method 500, a set of one or more robot instructions is determined 520. Several different types of instructions can be sent to the robot. Generally, an instruction causes the robot to change its body position by activating one or more motors. These motors control, for example, the angles of joints between two adjoining segments. An instruction can specify, for example, a desired joint torque or a desired joint angle position and the velocity and acceleration that should be used to achieve it.

In one embodiment, the determined set of instructions causes the robot's joint angles to match the new configuration (posture) determined in step 510. When the robot executes the set of instructions, it will perform a movement that will result in the robot achieving the new configuration. This, in turn, will increase the robot's potential energy.

In one embodiment, method 500 is performed repeatedly. For example, after method 500 has been performed once, the set of instructions is sent to the robot. Performing these instructions will cause the robot to move. As a result, the robot's posture can change. Method 500 will then be performed again. This time, the robot's "current configuration" (used in step 510) may have changed. As a result, the new configuration determined in step 510 may change. A set of robot instructions is then determined based on the new configuration. In one embodiment, method 500 is performed at a rate of 200 Hz (i.e., 200 times per second) until the robot's potential energy has been maximized.

5. Additional Embodiments

Although the invention has been described in considerable detail with reference to certain embodiments thereof, other embodiments are possible as will be understood to those skilled in the art. For example, another embodiment is described in "A Biomechanically Motivated Two-Phase Strategy for Biped Upright Balance Control" by M. Abdallah and A. Goswami, Proceedings of the 2005 IEEE International Conference on Robotics and Automation (ICRA), Barcelona, Spain, April 2005, pp. 2008-2013, which is hereby incorporated by reference.

Appendix A

CoP Position Indicates Underactuation

1. Background

Balance maintenance in biped robots is a difficult problem. Biped, and legged robots in general, are underactuated systems with intermittent and unilateral frictional contacts with the ground. While a robot is acted upon by the gravity field, it is free to leave the support surface (and fall down). Balance is maintained not through direct actuation but by means of dynamic coupling between the body limbs and the underactuated DOFs at the foot-ground contact. Finally, the large number of DOFs typical to bipeds makes the entire balance issue more complex.

While one cannot alter the physics of the balance problem, the complications due to the DOF problem can be somewhat mitigated by identifying a criterion that reflects a robot's state of balance. If such a criterion can be readily measured or computed, it can be employed in controlling the biped, instead of dealing with a high-dimensional state vector.

Robotics literature uses a few such balance criteria. They include the ground projection of the center of mass; the CoP, which is also known as the zero-moment point (ZMP); and the FRI point. The CoP is the point at which the resultant GRF of the robot acts such that the resultant moment is orthogonal to the ground contact surface. It is situated within the convex hull of the foot support area, and during a double support state it is not necessarily located under a foot. Out of the above criteria, CoP is the one that is most frequently used in dynamic gait.

The above points are all ground-based points. Each is a 2-DOF criterion consisting of the coordinates of the respective point. They are usually referred to as the "biped stability" criteria and are used in a variety of control strategies designed to maintain biped balance during upright stance and gait. In particular, robotics literature has customarily equated the location of the CoP (or the ZMP) in the interior of the foot support base with the stability of the robot. This has been a source of confusion chiefly for two reasons. First, in the absence of a rigorous mathematical definition of "stability," the significance of a CoP position is not completely clear. Second, the CoP/ZMP position is an insufficient characterization regardless of the chosen working definition of stability.

2. Degree of Underactuation (DoU)

In statics, stability characterizes the nature of equilibrium of a system. It is related to a potential energy function such as a spring energy function or the gravitational potential function. Based on the geometry of the potential function surface at a given state, a system is said to be in stable, unstable, or neutral equilibrium. Stability in a dynamic system refers to the nature of a system at a certain state that characterizes whether an applied disturbance will linger uninhibited, grow, or damp down over time. Orbital stability refers to the disturbance response of a system pertaining to its orbit or trajectory where the effect of time is ignored. In biomechanics, reference is made to postural stability which characterizes, mainly in statics context, the balance of a human posture against disturbance forces.

As indicated earlier, the CoP (or ZMP) stability condition does not characterize any of the traditional definitions of stability. A CoP on the boundary does not automatically preclude the system from maintaining sustainable, periodic motion. Nor does a CoP in the interior of the foot guarantee not hitting the ground. Rather, the CoP position characterizes the "degree of underactuation" of a robot.

Figure 6:
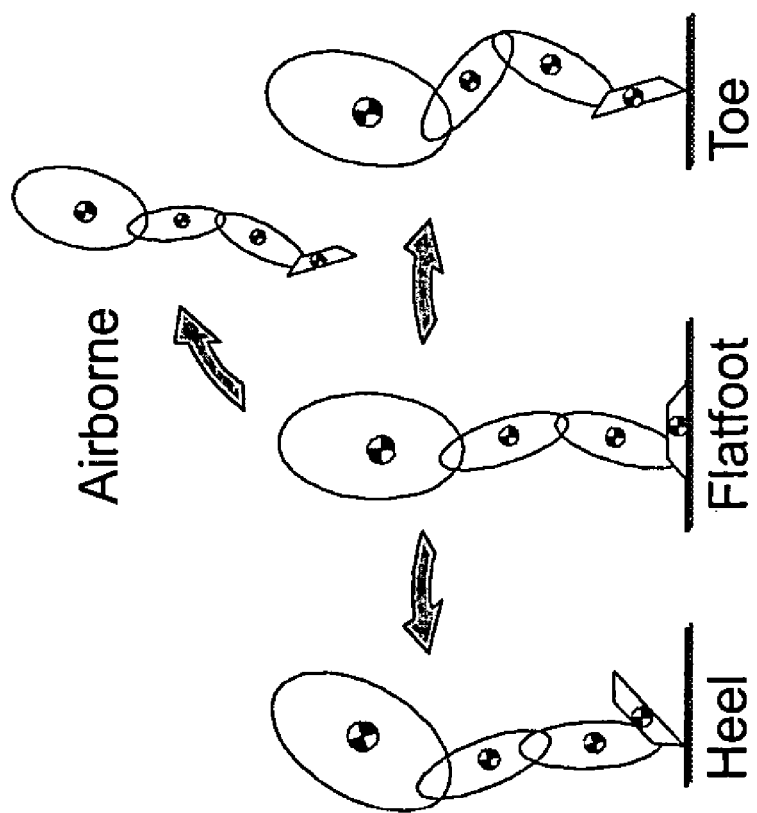
FIG. 6 illustrates a diagram of four kinematic foot-ground contact states, according to one embodiment of the invention.

A robot has four kinematic foot-ground contact states. FIG. 6 illustrates a diagram of four kinematic foot-ground contact states, according to one embodiment of the invention. In the flatfoot state, the foot is flat against the ground. In the toe state and heel state, the foot pivots around the toe and the heel, respectively. In the airborne state, the foot is completely lifted off the ground.

In the airborne state, the robot has six DOFs, consisting of the three DOFs for the foot [x, y, $\alpha$] and three joint DOFs for the kinematic chain [$\theta_a$, $\theta_k$, $\theta_h$]. In the toe and heel states, the foot can rotate but not slide. Each state has four DOFs: the three joint DOFs from the kinematic chain plus the rotation of the foot. Finally, the flatfoot state has three DOFs. The flatfoot state is the most secured.

Figure 7:
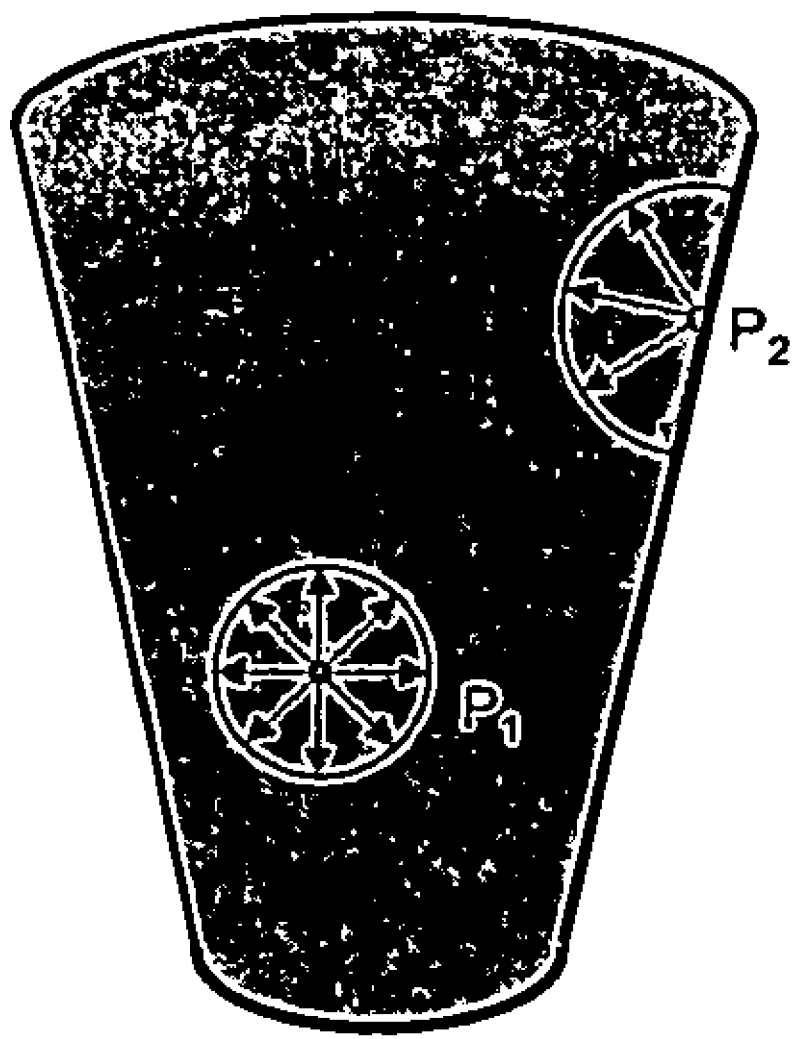
FIG. 7 illustrates a diagram of a robot footprint, point $P_1$, and point $P_2$, according to one embodiment of the invention.

FIG. 7 illustrates a diagram of a robot footprint, point $P_1$, and point $P_2$, according to one embodiment of the invention. Since the CoP is the resultant point of support of the robot, it cannot exit the support base. When the robot feet are flat and resting on a level surface, the CoP is located strictly within the interior of the support base and is free to move in all directions. This corresponds to the flatfoot state and is depicted by point $P_1$ (and the arrows) in FIG. 7. A CoP on the perimeter of the support base indicates that the foot is pivoting or rotating about the boundary (or is on the verge of doing so). This corresponds to the toe and heel states and is depicted by point $P_2$ in FIG. 7. Note that when the CoP is on the perimeter, it can travel only towards the interior of the support base. During the airborne state, the robot is not in contact with the ground, and the CoP does not exist.

Underactuation in biped robots is caused by the presence of fewer actuators than DOFs. The degree of underactuation (DoU) is defined as the number of DOFs minus the number of actuators. In the airborne state, the robot has six DOFs, consisting of the three DOFs for the foot [x, y, $\alpha$] and three DOFs for the kinematic chain [$\theta_a$, $\theta_k$, $\theta_h$]. Since the robot has three actuators, the airborne state has three DoU. Each of the toe and the heel states has four DOFs: the three from the kinematic chain plus the rotation of the foot. Both of these states thus have one DoU. The flatfoot state is the only state that is fully actuated, with zero DoU.

If the position of the CoP does not capture the stability of a robot, what quantity does it capture? It turns out that the CoP, with its characterization of the DoU, carries fundamental implications for the control of the robot.

3. Implications of Underactuation for Controllability

The objective is to prevent a biped from undergoing a fall. In other words, starting from a state deemed unsafe, the biped should be capable of returning to a secured "home" state. Whether a robot can actually do this depends on its controllability, defined as the existence of a control input to drive the robot from any initial state to the home position in finite time. Generally, the higher the DoU, the lower the available number of control inputs, and the worse the system controllability becomes.

Researchers have struggled with the control of nonholonomic systems, with examples arising in the fields of wheeled vehicles, space robots, and rolling contacts for robotic hands. These systems have first-order constraints, and their controllability is known. Underactuated manipulators, on the other hand, have second-order nonholonomic constraints, which are much more difficult. A general theory for the control and planning of second-order systems still does not exist, and determining their controllability is challenging. It has been shown that a fully actuated, planar manipulator is fully controllable. There is no systematic way of determining what type of underactuated planar manipulator is controllable. However, it has been shown that when the first (base) joint is passive, the manipulator loses its full controllability.

This result is significant, indicating that as the position of the CoP moves from the interior of the support base to the perimeter, the robot loses controllability. Admittedly, a biped diverges from the fixed-based manipulator model. However, as long as the foot remains in flatfoot contact with the ground and friction is sufficient to prevent slip, the manipulator analogy of the biped is valid and the controllability characterization is applicable.

The CoP criterion thus characterizes the DoU and the subsequent controllability of the robot, not its stability. The objective is to maintain the full controllability of the robot. One way to achieve this is by regulating the CoP to keep it strictly interior of the support base.

Appendix B

Derivation of the CoP Position

Equation 1 contains the general relationship for the CoP on a multi-body system with a distributed ground contact. We define the CoP as the point P where the distributed contact forces can be resolved into a resultant force R and a resultant moment $M_P$ that is orthogonal to the contact surface. The CoP will always lie in the convex hull of the ground support. In the planar case, the CoP becomes the point with no resultant moment (i.e., $M_P=0$).

Figure 8:
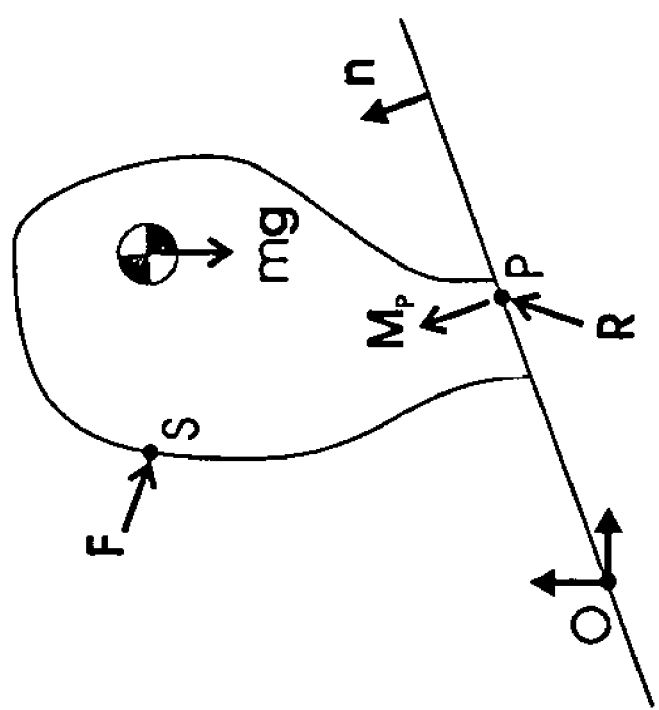
FIG. 8 illustrates a diagram of a general, spatial multi-body system with a distributed ground contact, according to one embodiment of the invention.

FIG. 8 illustrates a diagram of a general, spatial multi-body system with a distributed ground contact, according to one embodiment of the invention. The origin O of the reference system lies in the plane of the foot-ground contact. If the ground is planar, O will lie within that plane. Following are the equations of motion:

$$R + mg + F = ma_G \quad (20)$$

$$M_P + OP \times R + OG \times mg + OS \times F = \dot{H}_O \quad (21)$$

where m is the total mass of the system and $\dot{H}_O$ is the derivative of angular momentum about O. Rearranging Equation 21 and taking the cross-product with the contact surface normal n gives us:

$$n \times (M_P + OP \times R) = n \times (\dot{H}_O - OG \times mg - OS \times F) \quad (22)$$

Noting that $M_P$ is orthogonal to the contact surface and that OP lies in the plane of the surface, the cross-product property of $a \times b \times c = b(a \cdot c) - c(a \cdot b)$ enables us to solve for the CoP position:

$$OP = \frac{n \times (\dot{H}_o - OG \times mg - OS \times F)}{n \cdot R} \quad (23)$$

Alternatively, the CoP can be derived from the angular momentum about the CoM:

$$OP = \frac{n \times (\dot{H}_G + OG \times m(a_G - g) - OS \times F)}{n \cdot R} \quad (24)$$

What is claimed is:

1. A method for determining instructions to send to a legged robot subjected to a force, the method comprising:
    determining a desired rate of change of the robot's angular momentum at the robot's centroid;
    determining a first set of instructions to send to the robot that will cause the robot to yield to the force, wherein the first set of instructions is determined responsive to the desired rate of change of the robot's angular momentum at the robot's centroid; and
    determining a second set of instructions to send to the robot that will cause the robot to achieve a stable upright posture.

2. The method of claim 1, wherein the desired rate of change of the robot's angular momentum at the robot's centroid is proportional to a horizontal deviation of the robot's center of pressure from the robot's center of mass.

3. The method of claim 1, wherein the first set of instructions is further determined responsive to a desired rate of change of the robot's linear momentum at the robot's centroid.

4. The method of claim 3, wherein the desired rate of change of the robot's linear momentum at the robot's centroid is proportional to the robot's linear momentum at the robot's centroid.

5. The method of claim 1, wherein determining the second set of instructions to send to the robot comprises determining the second set of instructions to send to the robot responsive to a gravitational potential energy of the robot.

6. The method of claim 5, wherein the stable upright posture maximizes the robot's gravitational potential energy.

7. The method of claim 5, wherein determining the second set of instructions to send to the robot responsive to the gravitational potential energy of the robot comprises:
    using an algorithm to optimize a gravitational potential energy of the robot, wherein a current configuration of the robot is used to determine a desired configuration of the robot, and wherein a gravitational potential energy of the desired configuration of the robot is larger than a gravitational potential energy of the current configuration of the robot; and
    determining an instruction to send to the robot that will cause the robot to achieve the desired configuration.

8. The method of claim 1, wherein determining the second set of instructions to send to the robot comprises determining the second set of instructions to send to the robot responsive to a static joint torque of the robot.

9. The method of claim 8, wherein the stable upright posture minimizes the robot's static joint torque.

10. The method of claim 1, wherein determining the first set of instructions comprises:
    determining a set of joint accelerations that will generate the desired rate of change of the robot's angular momentum at the robot's centroid;
    determining a set of joint torques that will generate the determined set of joint accelerations; and
    determining an instruction to send to the robot that will cause the robot to generate the determined set of joint torques.

11. A computer program product for determining instructions to send to a legged robot subjected to a force, the computer program product comprising a computer readable storage medium having stored thereon computer readable instructions which, when executed in a computer system, cause the computer system to perform a method comprising:
    determining a desired rate of change of the robot's angular momentum at the robot's centroid;
    determining a first set of instructions to send to the robot that will cause the robot to yield to the force, wherein the first set of instructions is determined responsive to the desired rate of change of the robot's angular momentum at the robot's centroid; and
    determining a second set of instructions to send to the robot that will cause the robot to achieve a stable upright posture.

12. The computer program product of claim 11, wherein the desired rate of change of the robot's angular momentum at the robot's centroid is proportional to a horizontal deviation of the robot's center of pressure from the robot's center of mass.

13. The computer program product of claim 11, wherein the first set of instructions is further determined responsive to a desired rate of change of the robot's linear momentum at the robot's centroid.

14. The computer program product of claim 11, wherein determining the second set of instructions to send to the robot comprises determining the second set of instructions to send to the robot responsive to a gravitational potential energy of the robot.

15. The computer program product of claim 11, wherein determining the second set of instructions to send to the robot comprises determining the second set of instructions to send to the robot responsive to a static joint torque of the robot.

16. A system for determining instructions to send to a legged robot subjected to a force, the system comprising a processor configured to execute a method comprising:

determining a desired rate of change of the robot's angular momentum at the robot's centroid;

determining a first set of instructions to send to the robot that will cause the robot to yield to the force, wherein the first set of instructions is determined responsive to the desired rate of change of the robot's angular momentum at the robot's centroid; and determining a second set of instructions to send to the robot that will cause the robot to achieve a stable upright posture.

17. The system of claim 16, wherein the desired rate of change of the robot's angular momentum at the robot's centroid is proportional to a horizontal deviation of the robot's center of pressure from the robot's center of mass.

18. The system of claim 16, wherein the first set of instructions is further determined responsive to a desired rate of change of the robot's linear momentum at the robot's centroid.

19. The system of claim 16, wherein determining the second set of instructions to send to the robot comprises determining the second set of instructions to send to the robot responsive to a gravitational potential energy of the robot.

20. The system of claim 16, wherein determining the second set of instructions to send to the robot comprises determining the second set of instructions to send to the robot responsive to a static joint torque of the robot.

* * * * *